United States Patent [19]

Benz et al.

[11] Patent Number: 5,785,346
[45] Date of Patent: Jul. 28, 1998

[54] ASSEMBLY CONSISTING OF AN ELONGATE HOUSING AND A GAS GENERATOR ACCOMMODATED THEREIN

[75] Inventors: Gerhard Benz, Essingen; Thomas Grupp, Welzheim, both of Germany

[73] Assignee: TRW Occupant Restraint Systems GmbH, Alfdorf, Germany

[21] Appl. No.: 709,198

[22] Filed: Aug. 23, 1996

[30] Foreign Application Priority Data

Aug. 23, 1995 [DE] Germany .................. 295 13 565 U

[51] Int. Cl.$^6$ .................................................. B60R 21/26
[52] U.S. Cl. ...................... 280/728.2; 280/731; 280/741
[58] Field of Search ............................ 280/728.2, 731, 280/740, 741

[56] References Cited

U.S. PATENT DOCUMENTS

| 4,153,273 | 5/1979 | Risko | 280/740 |
| 5,458,364 | 10/1995 | Mueller et al. | 280/728.2 |

*Primary Examiner*—Kenneth R. Rice
*Attorney, Agent, or Firm*—Tarolli, Sundheim, Covell Tummino & Szabo

[57] ABSTRACT

An assembly for a gas bag restraint system is provided. This assembly comprises an elongate housing provided with open axial ends. Within the housing a gas generator is accomodated which is held axially between two covers closing said open ends of said housing.

7 Claims, 1 Drawing Sheet

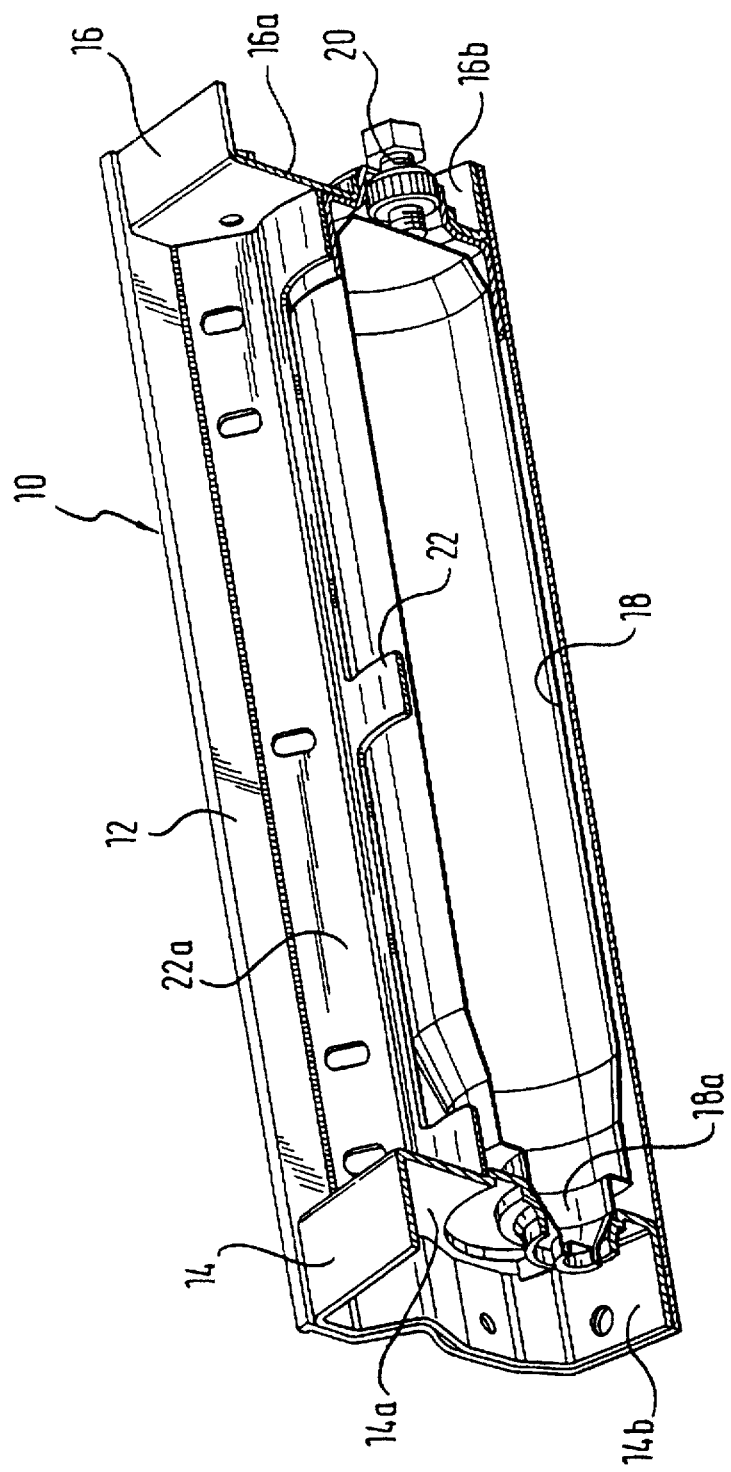

ASSEMBLY CONSISTING OF AN ELONGATE HOUSING AND A GAS GENERATOR ACCOMMODATED THEREIN

TECHNICAL FIELD

The invention relates to a vehicle occupant restraint system and in particular to an assembly comprising an elongate housing and a gas generator accommodated therein.

BACKGROUND OF THE INVENTION

The fitting of a gas generator in the housing of a gas bag restraint system is usually effected by means of a flanged joint. Such a flange joint requires some components which must be mounted after the insertion of the gas generator.

BRIEF SUMMARY OF THE INVENTION

The invention provides an assembly for a gas bag restraint system. This assembly comprises an elongate housing provided with open axial ends. Within the housing a gas generator is accomodated which is held axially between two covers closing said open ends of said housing. This design provides a an assembly which is distinguished by particularly simple mounting and the fact that there is no need for the usual fitting and mounting parts. Further, this design provides that the gas generator is merely inserted in the housing, with the option of having one of the two covers already mounted, and then the second cover is inserted which already fixes the gas generator axially. To compensate for tolerances, however, it is advisable to fit the cover located on the base side of the gas generator with a clamping screw whose end projecting into the housing is clamped against the base of the gas generator.

The main elongate body of the housing is preferably manufactured from a generally trough-shaped extruded profile part. Adaptation to the various lengths of gas generator is thus possible without any additional tool costs. In such an embodiment the gas generator is preferably secured radially in the housing by a holding plate partly encompassing the outer periphery of the gas generator and fixed to the housing.

Further advantages and characteristics of the invention follow from the description below and from the drawing.

BRIEF DESCRIPTION OF THE DRAWING

In the drawing the only figure represents an advantageous embodiment of the assembly in an axial section shown in perspective.

DETAILED DESCRIPTION OF A PREFERRED EMBODIMENT

The housing of the assembly, generally designated as 10, consists of a elongate main body 12 manufactured from a trough-shaped extruded profile part, and of two covers 14, 16 inserted in the open ends of the main body 12. Besides a radial wall 14a and 15a, each of these covers 14, 16 has a circumferential wall 14b and 16b in contact with the inside of the main body 12.

The gas generator 18 has the form of an elongate cylindrical bottle with a flat base and a narrowed neck. The narrowed neck 18a of the gas generator 18 protrudes through an opening in a part of the radial wall 14a of the cover 14 which is stepped by a bead.

The cover 16 is fitted with a clamping screw 20 whose inner end projects into the housing and is clamped against the base of the gas generator 18. Dimensional tolerances of the gas generator or of the housing are compensated for by means of this clamping screw 20.

Furthermore, in the region of its radial wall 16a, the cover 16 is furnished with imprints providing guiding and centering surfaces for the gas generator 18.

The open side of the trough-shaped main body 12 is secured by a holding plate 22 partly encompassing the outer periphery of the gas generator 18 and connected to the main body 12 along two lateral strips 22a, so that the gas generator 18 is also fixed radially in the housing 10.

For assembly purposes, the cover 16 is first placed in the main body 12 of the housing 10 and fixed to it. The holding plate 22 is then placed in position and fixed to the main body 12. The gas generator 18 can now be pushed in in the longitudinal direction of the housing, and is centered and radially aligned by the guiding and centering surfaces in the cover 16. The cover 14 is then inserted in the opposite end of the main body 12 and fixed to it. By means of the clamping screw 20, the gas generator 18 now only has to be secured in the axial direction and placed under a certain pretension, which concludes the assembly of the gas generator.

We claim:

1. An assembly for a gas bag restraint system, comprising an elongate housing provided with surface means extending substantially parallel to a longitudinal axis of said housing and open axial ends, said housing being formed of a first piece of material, and a gas generator accommodated within said housing and held axially between two covers closing said open ends of said housing, said two covers extending transverse to the longitudinal axis of said housing and being formed of third and fourth pieces of material.

2. The assembly of claim 1 wherein said gas generator is secured radially in said housing by a holding plate partly encompassing an outer periphery of said gas generator and fixed to said housing.

3. The assembly of claim 1 wherein said housing has an elongate main body manufactured from a generally trough-shaped extruded profile part.

4. The assembly of claim 3 wherein each of said covers comprises a circumferential wall in contact with the inside of said main body.

5. The assembly of claim 1 wherein a first one of said covers comprises an opening through which a narrowed end of said gas generator protrudes.

6. The assembly of claim 1 wherein said covers are furnished with guiding and centering surfaces for said gas generator.

7. An assembly for a gas bag restraint system, comprising an elongate housing provided with open axial ends, and a gas generator accommodated within said housing and held axially between two covers closing said open ends of said housing, one of said covers being fitted with a clamping screw whose end projects into said housing and is clamped against a base of said gas generator.

* * * * *